May 22, 1951 B. E. HOUSE 2,554,301
ADJUSTING MEANS FOR BRAKE ACTUATORS
Filed Oct. 24, 1947

INVENTOR.
BRYAN E. HOUSE
BY
T. J. Plante
ATTORNEY

Patented May 22, 1951

2,554,301

UNITED STATES PATENT OFFICE 2,554,301

ADJUSTING MEANS FOR BRAKE ACTUATORS

Bryan E. House, South Bend, Ind., assignor to Bendix Aviation Corporation, South Bend, Ind., a corporation of Delaware Application October 24, 1947, Serial No. 781,992

4 Claims. (Cl. 188—79.5)

This invention relates to actuators for brakes, such as the wheel cylinders of hydraulically operated drum brakes.

In brakes of the internal-expanding-shoe type, if it is necessary or desirable to provide an adjustor between the piston of the actuator and the adjacent end of the brake shoe, the customary arrangement consists of an adjusting screw having a threaded stem screwed into the piston and a head which engages the end of the brake shoe. By rotating the adjusting screw relative to the piston, the distance between the end of the shoe and the piston may be adjusted.

In order to insure that rotation of the adjusting screw will move the screw longitudinally with respect to the piston, it is necessary to insure that the piston does not rotate with the adjusting screw due to thread friction.

The primary object of the present invention is to provide novel and inexpensive means for preventing the piston from rotating when the adjusting screw is turned.

Figure 2:
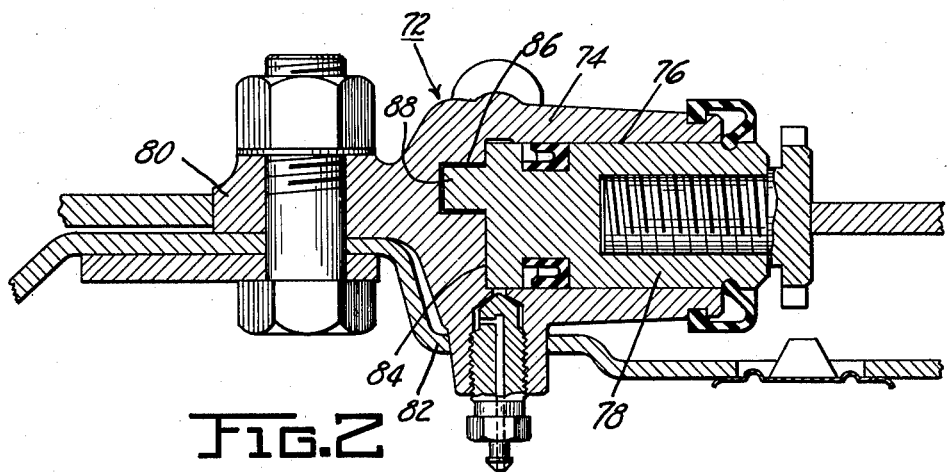
Figure 1:
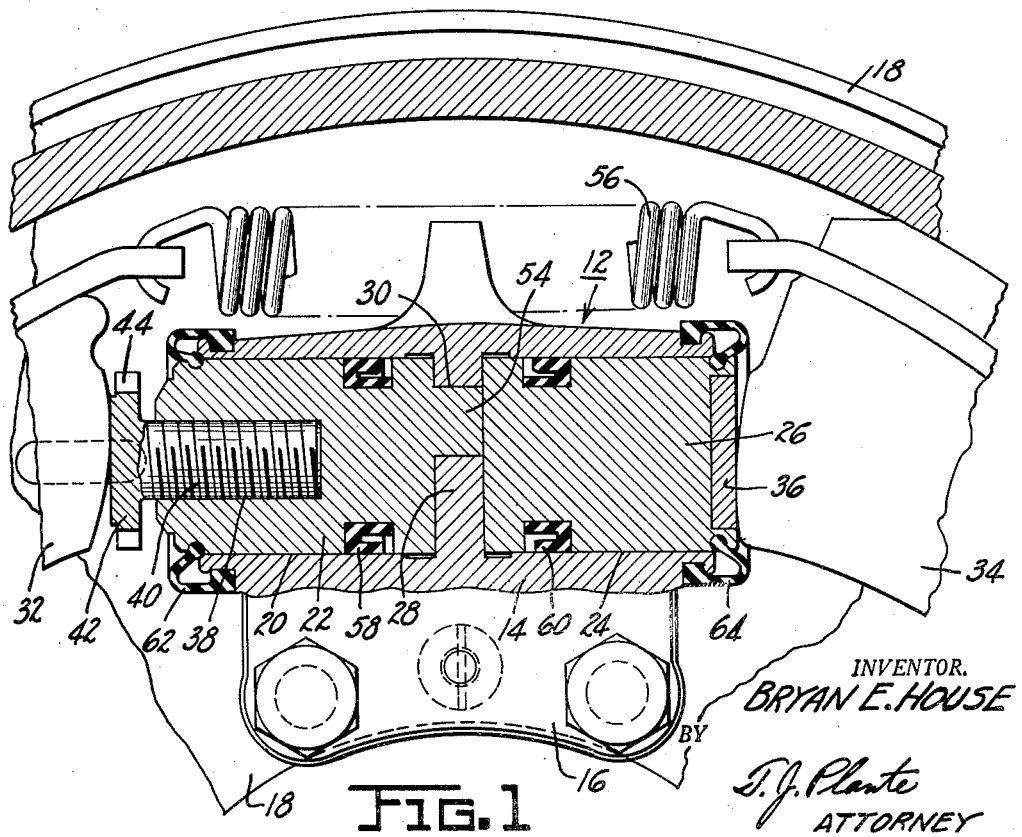

Other objects and advantages of the present invention will become apparent during the following description of two illustrative embodiments, reference being had therein to the accompanying drawing, in which:

Figure 1 is a sectional view of part of a brake assembly, showing the incorporation of the invention in a wheel cylinder having two pistons reciprocable therein; and Figure 2 is a sectional view of part of a brake assembly, showing the incorporation of the invention in a wheel cylinder having only one piston reciprocable therein.

Referring to Figure 1, the hydraulic wheel cylinder, or actuator, which is identified by the numeral 12, comprises a casing 14 which is secured, by means of a flange 16, to a supporting plate 18. One end of the casing 14 has a cylindrical bore 20 formed therein, in which a piston 22 is adapted to reciprocate. The other end of the casing has a bore 24, containing a piston 26. The bores 20 and 24 are separated by an internal flange, or wall, 28 which serves as an anchor for the pistons 22 and 26, and which locates said pistons in released position. An opening 30 extends through the internal wall 28 to interconnect the chambers formed on opposite sides of the wall. The opening 30, instead of being formed at the center of the wall, i. e. concentric with the axis of the bores 20 and 24 is eccentric, or off-center, with respect to said axis, for a reason hereinafter explained.

A fluid inlet (not shown) connects the inner ends of the bores 20 and 24 to a source of fluid pressure, such as a conventional master cylinder. The outer ends of pistons 22 and 26 are operatively associated with the ends of brake shoes 32 and 34, respectively. Piston 26 engages brake shoe 34 directly, a hardened insert 36 being provided to take the anchoring torque of the shoe. Piston 22 does not engage shoe 32 directly, but instead has a threaded opening 38 formed in its outer end, into which is screwed the threaded stem 40 of an adjusting screw, the head 42 of which engages the end of shoe 32.

Adjustment of the released position of shoe 32 to compensate for lining wear is accomplished by rotating the head 42 of the adjusting screw, which is provided with a serrated periphery 44 to make it easier to turn the screw. Rotation of the adjusting screw moves it longitudinally with respect to piston 22, and thereby varies the distance between the end of shoe 32 and the piston-locating wall 28. A slot is provided in supporting plate 18 to permit access to the adjusting screw with a suitable tool, by means of which the screw can be turned.

In order to prevent piston 22 from rotating as the adjusting screw is turned, the inner end of the piston is provided with an eccentric, or off-center, projection 54, which extends into the opening 30. With this construction, the piston is prevented from rotating, without adding any costly structural parts to the wheel cylinder. The length of projection 54 is greater than the maximum stroke of the piston, in order that the projection cannot move entirely out of opening 30 during the shoe-actuating movement of the piston. The maximum stroke of the piston is that which can be obtained by maximum movement of the brake pedal or control lever.

A return spring 56 is connected in tension between ends of shoes 32 and 34, in order to retain the shoes and pistons in released position until sufficient hydraulic pressure is exerted between the pistons to overcome the return spring. Suitable seals 58 and 60 are carried by pistons 22 and 26 to prevent escape of hydraulic fluid. Boots 62 and 64 are provided, which encircle the outer ends of the pistons to keep dirt from entering the wheel cylinder.

Figure 2 shows the incorporation of the invention in a wheel cylinder having only one piston. The wheel cylinder 72 has a casing 74 provided with a bore 76, in which a piston 78 is adapted to reciprocate. The other end of the casing is closed and has an integral flange 80 which is secured to the supporting plate 82.

The closed end of the casing provides a piston-locating wall 84, in which is formed an eccentric or off-center, opening 86, arranged to serve the same purpose as the opening 30 in Figure 1. The eccentric, or off-center, projection 88 on the inner end of piston 78 extends into the opening 86 to prevent rotation of the piston. The outer end of the piston carries an adjusting screw 90, which corresponds to the adjusting screw shown in Figure 1.

Although only two embodiments of the invention have been illustrated and described, various changes in the form and relative arrangements of the parts may be made to suit requirements.

I claim:

1. In a brake, a wheel cylinder which is arranged to actuate a brake shoe and to locate said shoe in released position comprising a casing having an open-ended cylindrical bore, an internal piston-locating wall formed at the inner end of said bore, said wall having an opening therein which is eccentrically located with respect to the axis of the bore, a piston reciprocable in the bore having a surface arranged to engage the wall in released position and having an eccentric projection which extends into the opening in the wall, the length of the projection being greater than the maximum stroke of the piston, said piston having a threaded opening in the outer end thereof, and an adjusting screw having a threaded stem engaging said threaded opening and a head provided with a serrated periphery and adapted to engage the end of the brake shoe to locate the same relative to the piston.

2. In a brake, a wheel cylinder which is arranged to actuate a brake shoe and to locate said shoe in released position comprising a casing having an open-ended cylindrical bore, an internal piston-locating wall formed at the inner end of said bore, said wall having an opening therein which is eccentrically located with respect to the axis of the bore, a piston reciprocable in the bore having a surface arranged to engage the wall in released position and having an eccentric projections which extends into the opening in the wall, said piston having a threaded opening in the outer end thereof, and an adjusting screw having a threaded stem engaging said threaded opening and a head provided with a serrated periphery and adapted to engage the end of the brake shoe to locate the same relative to the piston.

3. In a brake, a hydraulic wheel cylinder adapted to actuate a brake shoe comprising a casing having two axially coextensive bores separated by a wall provided with an eccentric opening, two pistons, one for each bore, one of said pistons having a projection extending into said wall opening whereby said one piston will be held against rotation, said other piston being capable of rotating in its bore, and an adjusting screw coaxially received in the outer end of said one piston and adapted to engage the aforementioned brake shoe.

4. In a brake, a hydraulic wheel cylinder adapted to actuate a brake shoe comprising a casing having two axially coextensive bores separated by a wall provided with an eccentric opening, two pistons, one for each bore, one of said pistons having a portion cooperatively associated with said wall opening whereby said one piston will be held against rotation, said other piston being capable of rotating in its bore, and an adjusting screw received in the outer end of said one piston and adapted to engage the aforementioned brake shoe.

BRYAN E. HOUSE.

REFERENCES CITED

The following references are of record in the file of this patent:

UNITED STATES PATENTS

| Number | Name | Date |
|---|---|---|
| 1,934,411 | Dahlman | Nov. 7, 1933 |
| 2,298,008 | Goepfrich | Oct. 6, 1942 |
| 2,313,432 | Goepfrich | Mar. 9, 1943 |